United States Patent Office 3,153,658
Patented Oct. 20, 1964

3,153,658
PROCESS AND PRODUCTS
Walter R. Hertler, Wilmington, Del., assignor to E. I. du
Pont de Nemours and Company, Wilmington, Del., a
corporation of Delaware
No Drawing. Filed Jan. 4, 1962, Ser. No. 164,409
11 Claims. (Cl. 260—396)

This invention relates to 13,13,14,14-tetracyanodiphenoquinodimethans, and is more particularly concerned with the homopolymers thereof which because of conversion to the benzenoid configuration are more properly described as poly(p,p' - biphenylylenebis(dicyanomethylenes); salts of the monomeric, semiquinoid configuration anion radical of said quinodimethans; and a process for preparing the intermediate homopolymers and the final product salt charge-transfer compounds.

Diphenoquinodimethan itself has been reported several times in the literature (see, for instance, Szwarc, J. Polymer Sci. 6, 319 (1951)). 13,14-diphenyldiphenoquinodimethan has also been reported (see Syrkin et al., Acta Physicochim. 21, 641 (1946)). The 13,13,14,14-tetrahydrocarbyl, including tetraaryl, substituted diphenoquinodimethans have also been reported by several workers (see, for instance, Müller et al., Ber. 74, 1051 (1941)). Pullman et al., "Les Theories Electroniques d'La Chemie Organique," Masson, Editeur, Paris (1952), report the preparation of the 13,13,14,14-tetraaryl-2,9-dimethyl-derivatives and allege the formation of the 3,5,7,11-tetrachloro-13,13,14,14-tetraphenyl and other halomatic substituted diphenoquinodimethan derivatives.

Later work has shown that these latter compounds were biradicals and not quinodimethans. In fact, to the present day no diphenoquinodimethan derivative has been reported wherein any functional substituent is present either on the ring carbons or on the exocyclic methylene carbons.

It is an object of this invention to provide diphenoquinodimethan derivatives having functional substituents. It is a further object of this invention to provide salt charge-transfer compounds of 13,13,14,14 - tetracyanodiphenoquinodimethans. A still further object of this invention is to provide a process for preparing the aforesaid salt charge-transfer compounds, which process involves the formation of intermediate poly(p,p'-biphenylylenebis(dicyanomethylene)) isolatable as homopolymers of the benzenoid configuration. Other objects of this invention will appear hereinafter.

These and other objects of this invention are accomplished by means of a process which proceeds according to the following stoichiometry based on bi(benzyl cyanides), for example, p,p'-bis(cyanomethyl)biphenyl.

In the foregoing synthesis, the cation is that of a Lewis base; and, in the symbol — indicates a negative ionic charge and . indicates an electron. As will be seen from this stoichiometry, the dinitrile is carboalkoxylated to form the bis(cyanoacetic)ester derivative, which in turn is converted (most conveniently with ammonia) to the cyanoacetamide derivative, which in turn is dehydrated with a strong dehydrating agent, for instance, POCl₃, to form the tetranitrile, i.e. p,p'-biphenylylenedimalononitrile, which in turn is oxidized, or more properly, dehydrogenated to the homopolymer of tetracyanodiphenoquinodimethan in the benzenoid configuration, which in turn when treated with a source of the desired Lewis base forms the corresponding salt of 13,13,14,14-tetracyanodiphenoquinodimethan anion radical, i.e., the 13,13,14,14-tetracyanodiphenoquinodimethanide.

NH₃ in the foregoing is used most conventionally to represent ammonia itself although any other convenient source thereof can also be used. The dehydration stage from the bis(cyanoacetamide) derivative to the tetranitrile can be effected by any suitable chemical dehydrating agent such as: phosphorous pentoxide, benzene sulfonyl chloride/pyridine, and the like, or, if desired, the dehydration step can be accomplished thermally simply by heating the compound to 400° C., or thereabouts. The oxidation or dehydrogenation step of the p,p'-biphenylylenedimalononitrile can be accomplished most readily by reaction with N-iodosuccinimide, although, if desired, the corresponding N-bromo and N-chloro derivatives can be used. However, reaction with the latter two is noticeably less rapid, and more drastic reaction conditions are indicated. The dehydrogenation can also be effected by treatment with selenium dioxide or the like.

As is illustrated in the foregoing series of equations, the final products, i.e., the salt charge-transfer compounds between Lewis bases and 13,13,14,14-tetracyanodiphenoquinodimethans, are obtained from the intermediate poly(α,α,α',α'-tetracyanobiphenylylenedimethylenes). Reaction thereon is effected by direct reaction with the requisite Lewis base.

The present invention is generic to charge-transfer compounds of 13,13,14,14 - tetracyanodiphenoquinodimethan (referred to hereafter for brevity as TCNDQ) with Lewis bases broadly, including specifically organic and organo-inorganic Lewis bases.

Charge-transfer compounds of previously known Lewis acids with Lewis bases are well known in the art. Frequently these charge-transfer compounds were referred to as Pi complexes. More recently, the concept has become well established that such complexes are more properly described as charge-transfer compounds—see, for

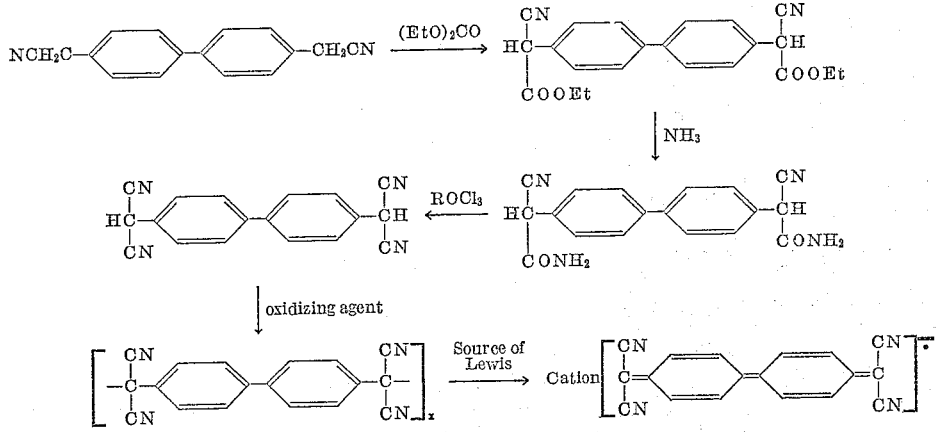

instance, Mulliken, J. Am. Chem. Soc. 74, 811 (1952). The charge-transfer compounds of TCNDQ with Lewis bases range in degree of charge transfer from those of true complex structure to those where actual and complete charge transfer exists in the ground electronic state. Compounds of the last-mentioned type constitute so-called anion-radical salts wherein at least one molecule of TCNDQ carries a transferred electron, and accordingly a negative electronic charge, and at least one molecule of the Lewis base component has donated at least one electron to the TCNDQ component and accordingly has an electron deficiency.

The invention is generic to those charge-transfer compounds of TCNDQ with Lewis bases which exhibit a detectable paramagnetic resonance absorption under normal conditions. It is likewise generic to TCNDQ charge-transfer compounds wherein the maximum charge transfer occurs not in the ground electronic state but rather in the excited state (see Orgel, Quart. Rev. Chem. 8, 1422 (1954) for a discussion of this type of normally diamagnetic charge-transfer compounds).

Lewis bases which, with TCNDQ, form the necessary second component for forming the charge-transfer compounds of TCNDQ are well known to the chemical art (see G. N. Lewis, J. Franklin Inst. 226, 293 (1938) and following papers by Lewis and several coauthors). Broadly speaking, the Lewis base is, by definition, a molecule, the structure or configuration of which, electronically speaking, is so arranged that the molecule is capable of donating one or more electrons to a molecule which has an electron-deficient structure. Many and varied electron donor compounds are known. To list but a few well-recognized such classes there need only be named: the amines and various alkyl and aryl hydrocarbon-substituted amines which may be described structurally by the following two formulas:

where $R_1$, $R_2$, $R_3$ are H, alkyl or alkylene up to 10 carbons and when $R_1$ is aryl, $R_2$ and $R_3$ are H or alkyl up to 20 carbons, and the corresponding quaternary ammonium salts as below,

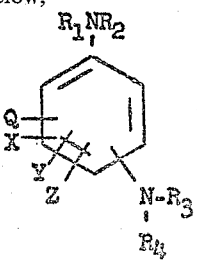

where the amino substituents are ortho or para to each other and $R_1$, $R_2$, $R_3$, $R_4$ are alkyl up to 20 carbons and Q, X, Y, Z are H or hydrocarbon up to 20 carbons, which can be together joined, or other ortho- or para-directing substituents with the provisos that (1) when $R_1$, $R_2$, $R_3$, and $R_4$ are alkyl, Q and X are H, (2) when $R_1$ and $R_3$ are aryl, $R_2$ and $R_4$ are H or alkyl, and (3) where Q—X and/or Y—Z taken pairwise are cycloalkylene or fused aromatic, $R_1$ and $R_3$ are H, and the corresponding quaternary ammonium salts where in the quaternary radical is another $R_1$, $R_2$, $R_3$, $R_4$ and any of the usual anions is involved.

Also included are the substituted amines of the alkyl and aryl hydrocarbon-substituted types defined by the foregoing two structural formulas wherein $R_1$, $R_2$, $R_3$, and/or $R_4$ are variously oxaalkylene or thiaalkylene or oxaalkyl or thiaalkyl, e.g., 4-thiapiperidine, as well as the hydroiodides of the foregoing primary, secondary, or teritary amines, and also the corresponding quaternary ammonium iodides, e.g., morpholine hydroiodide; all heterocycles containing nuclear nitrogen and the hydroiodides or alkyl iodide salts thereof; substituted ethylene of the type:

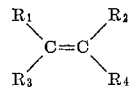

wherein from one to four of the $R_1$, $R_2$, $R_3$, or $R_4$ groups are amino or alkylamino, any remaining being alkyl, alkoxy, alkoxythio, aryl, aryloxy, or arylthio; and the hydroiodide or alkyl iodide salts thereof, including the plain iodides, e.g., of the ammonium type $R_3N^+ \cdot I^-$; and the Wurster iodides of aromatic amines, e.g., Wurster's blue iodide, $$(CH_3)_2\overset{+}{N}C_6H_4\overset{+}{N}(CH_3)_2$$

(In the foregoing diamines, it is expressly intended to include polynuclear diamines in which the nitrogens are connected by a conjugated system); the phosphines and alkyl or aryl hydrocarbon-substituted phosphines:

where $R_1$, $R_2$, and $R_3$ are alkyl or aryl up to 20 carbons (the aryls being unsubstituted or having o- and p-directing substituents)

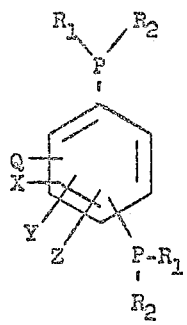

where $R_1$, $R_2$, Q, X, Y, and Z are as above in the aryl amine analogs except that $R_1$ and $R_2$ cannot be H, and the corresponding quaternary phosphonium salts wherein the quaternary radical is another $R_1$, $R_2$, $R_3$ and any of the usual anions is involved; the arsines and alkyl and aryl hydrocarbon-substituted arsines:

where $R_1$, $R_2$, and $R_3$ are as above in the phosphine analogs

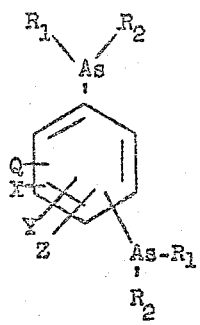

where $R_1$, $R_2$, Q, X, Y, and Z are as above in the aryl phosphine analogs, and the corresponding quaternary arsonium salts wherein the quaternary radical is another $R_1$, $R_2$, $R_3$ and any of the usual anions is involved; the stibines and alkyl and aryl hydrocarbon-substituted stibines:

where $R_1$, $R_2$, and $R_3$ are as above in the arsine analogs

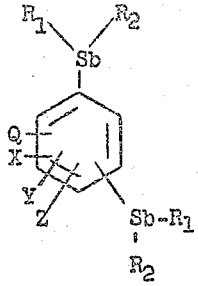

where $R_1$, $R_2$, Q, X, Y, and Z are as above in the aryl arsine analogs, and the corresponding quaternary stibonium salts wherein the quaternary radical is another $R_1$, $R_2$, $R_3$ and any of the usual anions is involved; the quaternary ammonium bases or their salts, such as $R_1R_2R_3R_4N^\oplus$ where $R_1$, $R_2$, $R_3$, and $R_4$ are H or alkyl up to 20 carbons; metal cations describable by $M^{+x}$ where M is a metal and $x$ is the formal cationic valence of the metal; metal chelates having all planar configurations, the atoms which coordinate with the metal being joined by a conjugated system of double bonds (aromatic or open chain); aromatic or heterocyclic aromatic aminophenels or ethers, the O and N atoms being connected by a conjugated system of double bonds; aromatic hydrocarbon or alkyl-substituted aromatic hydrocarbons including polynuclear ones; and polyhydric phenols and ethers thereof.

In all the foregoing instances, the molecular structure in the hydrocarbon moieties can also carry functional substituents. The preferred substituents can be classed as those which, when present on ring carbon of an aromatic nucleus, tend to direct any entering substituent radical into the ortho- or para-position, i.e., the so-called ortho-para orienting groups. These substituents have also been described by Price, Chem. Rev. 29, 58 (1941), in terms of the electrostatic polarizing force as measured in dynes of the said substituent groups on an adjacent double bond of the benzene nucleus. Quantitatively, any substituent which has or exhibits an electrostatic polarizing force in dynes less than 0.50 can be regarded as ortho-para orienting and electropositive, and is preferred here. These preferred substituents include: alkyl hydrocarbon up to 20 carbons; substituted alkyl up to 20 carbons, e.g., aminoalkyl, hydroxyalkyl, alkoxyalkyl, vinylalkyl, haloalkyl; hydroxy; alkoxy up to 20 carbons; thiol, alkyl thiol (up to 20 carbons); amino; N-alkylamino or N,N-dialkylamino with alkyls up to 20 carbons; N-mono-arylamino; and the like.

Suitable specific Lewis bases for making the TCNDQ/Lewis base charge-transfer compounds in molar ratios from 2/1 to 1/2 are given in the following list. In connection with the molar ratios just given, it is to be understood that the present charge-transfer compounds lie within the arithmetical range of the two molar ratio extremes and not solely at the extremes. Thus, charge-transfer compounds of the present invention are inclusive of, for instance, 3/2, 1.5/1, and the like TCNDQ/Lewis base charge-transfer compounds.

Useful specific Lewis bases include: ammonia, and amines, such as ethylamine, methylamine, dibutylamine, tridecylamine, and the like; diamines, such as 2,3-N,N,N',N'-hexamethyl-p-phenylenediamine, N,N'-dioctyl-1,5-diaminonaphthalene, 1,4 - diamino-5,6,7,8-tetrahydronaphthalene, and the like; phosphines and diphosphines, such as triphenylphosphine, tributylphosphine, ethyldioctylphosphine, 1,4 - bis(diethylphosphino)benzene, and the like; ammonium and quaternary ammonium bases and salts, such as ammonium iodide, ethyltrimethylammonium iodide, dioctylammonium iodide, methyltri-n-propylammonium iodide, tetramethylammonium hydroxide, and the like; metals, such as Na, K, Li, Ag, Cu, and the like; metal precursors, such as the carbonyls, iodides, cyanides, e.g., iron and cobalt carbonyls, iodides, cyanides, and the like; metal chelates, such as copper salicylaldimine, cobalt pyrrolealdehydeimine, nickel 4-methoxysalicylaldoxime, copper 5-methoxy-8-quinolinolate, and the like; heterocyclic aromatic amines, phenols, and ethers, such as 4-aminopyridine, 3-hydroxyacridine, 3-dimethylaminocarbazole, 2-methoxyphenazine, and the like; aromatic hydrocarbon ethers, such as phenetidine, N,N-diethylanisidine, and the like; aromatic hydrocarbons and alkyl substituted aromatic hydrocarbons, including polynuclear, such as chrysene, coronene, hexamethylbenzene, 2-ethylphenanthrene, and the like.

The invention is illustrated in further detail by the following example, in which the parts given are by weight.

EXAMPLE I

*Part A.—Preparation of dl- and Meso-p,p'-Biphenylylenebis(Ethyl Cyanoacetate)*

In a glass reactor fitted with heating and stirring means 4.11 parts of sodium metal was dissolved in 87 parts of ethyl alcohol. The unreacted ethyl alcohol was then removed by distillation under reduced pressure. To the remaining sodium ethoxide there was charged 100 parts of ethyl carbonate, 23 parts of toluene, and 20 parts of p,p'-bi(benzylcyanide), i.e., p,p'-bis(cyanomethyl)biphenyl. The resultant reaction mixture was stirred with heating such that the reaction mixture boiled and additional toluene was added from a dropping funnel at the same rate that the solvent distilled out of the reaction mixture maintaining, therefore, roughly a constant volume of reaction medium. After 1.5 hours and the addition of 86 parts of toluene under these conditions, the reaction mixture was cooled and poured into about 400 parts of water. Acetic acid (15 parts) was added and the mixture was then extracted twice with about 200 parts of methylene chloride. The combined methylene chloride extracts were washed with water and dried over anhydrous magnesium sulfate. The methylene chloride solvent was then removed by distillation under reduced pressure using a warm water bath as the heating source. The resultant residual oil was scratched in the presence of a pentane/diethyl ether mixture, thereby affording after filtration and drying 28 parts (86% of theory) of p,p'-biphenylylenebis(ethyl cyanoacetate) as a pale, tan, amorphous solid melting at 89–91.5° C. Recrystallization of a portion of the product from diethyl ether using a commercial decolorizing carbon afforded pure p,p'-biphenylylenebis(ethyl cyanoacetate) as a white solid melting at 79–85°C.

*Analysis.*—Calcd. for $C_{22}H_{20}N_2O_4$: C, 70.3%; H, 5.4%; N, 7.7%. Found: C, 70.6%; H, 5.4%; N, 7.2%.

An additional preparation of the product using substantially the same technique afforded p,p'-biphenylylenebis(ethyl cyanoacetate) as white crystals melting at 100–102° C. after recrystallization from diethyl ether.

*Analysis.*—Found: C, 70.3%; H, 5.6%; N, 7.2%.

*Part B.—Preparation of dl- and Meso-p,p'-Biphenylylenebis(Cyanoacetamide)*

A mixture of 35 parts of the above p,p'-biphenylylene-(ethyl cyanoacetate) and 400 parts of concentrated aqueous ammonium hydroxide was heated for one hour at steam bath temperatures. The reaction mixture was cooled and filtered and the filter cake was washed well with water and dried. There was thus obtained 25.7 parts (87% of theory) of dl- and meso-p,p'-biphenylylenebis(cyanoacetamide) as a tan solid melting at 206–216° C. Crystallization from a mixture of acetonitrile, dimethylformamide, and diethyl ether afforded 8.4 parts of the pure product as white crystals melting at 221–229° C.

*Analysis.*—Calcd. for $C_{18}H_{14}N_4O_2$: C, 67.9%; H, 4.4%. Found: C, 67.9%; H, 5.0%.

A second crop of the p,p'-biphenylylenebis(cyanoacetamide) amounting to 13.7 parts was obtained from the filtrate as a cream-colored solid melting at 221–231° C.

*Part C.—Preparation of p,p'-Biphenylylenedimalonitrile*

In a glass reactor fitted with stirring means, heating means, and a reflux water condenser, a mixture of 10 parts of the above p,p'biphenylylenebis(cyanoacetamide), seven parts of sodium chloride, 15 parts of phosphorus oxychloride, and 195 parts of acetonitrile was stirred at the reflux under a nitrogen atomsphere for four hours. After cooling, the reaction mixture was diluted with about 1,000 parts of ice water and the resultant mixture was extracted with about 300 parts of methylene chloride. The methylene chloride extract was washed with water and dried over anhydrous magnesium sulfate. After boiling the extract with a commercially available decolorizing charcoal and filtering, the methylene chloride solvent was removed by distillation under reduced pressure. The resultant residue was suspended in pentane and filtered. After drying, there was thus obtained 5.7 parts (64% of theory) of p,p'-biphenylylenedimalononitrile as a greenish-tan solid melting at 156–168° C. Recrystallization from ethyl acetate followed by recrystallization from benzene afforded pure p,p'-biphenylylenedimalononitrile as light blue crystals melting at 176–181° C.

*Analysis.*—Calcd. for $C_{18}H_{10}N_4$: C, 76.6%; H, 3.6%. Found: C, 76.9%; H, 3.6%.

The infrared spectrum of the product showed absorption at 2,890 cm.$^{-1}$ characteristic of the aryl-CH(CN)$_2$ group, at 2,270 cm.$^{-1}$ characteristic of an unconjugated cyano group, at 1,502 cm.$^{-1}$ characteristic of aromatic absorption, and at 845 cm.$^{-1}$ characteristic of a 1,4-disubstituted benzene structure.

*Part D.—Preparation of Poly($\alpha,\alpha,\alpha',\alpha'$-Tetracyanobiphenylylenedimethylene) or Poly(p,p'-Biphenylylenebis(Dicyanomethylene))*

To a filtered solution of 6.27 parts of N-iodosuccinimide in 78 parts of acetonitrile under nitrogen was added with stirring a filtered solution of 3.9 parts of the above p,p'-biphenylylenemalononitrile in 78 parts of acetonitrile. Immediate formation of an iodine color and a precipitate was observed. Upon filtration and drying, there was thus obtained 3.02 parts (77% of theory) of poly(p,p'-biphenylylenebis(dicyanomethylene)) as a pale purple solid. The product was purified by suspending in ether and filtering. After drying, the light purple solid product thus obtained did not melt at temperatures up to 405° C. The inherent viscosity of the polymer in dimethylformamide at 0.5% concentration was 0.27. The product exhibited a typically polymeric X-ray powder pattern.

*Analysis.*—Calcd. for $(C_{18}H_8N_4)_x$: C, 77.1%; H, 2.9%. Found: C, 77.1%; H, 3.8%.

*Part E.—Preparation of the Sodium Salt of 13,13,14,14-Tetracyanodiphenoquinodimethan Anion Radical, i.e., Sodium 13,13,14,14-Tetracyanodiphenoquinodimethanide*

A solution of 0.3 part of sodium iodide in 7.8 parts acetonitrile was added to a mixture of 0.28 part of the above poly($\alpha,\alpha,\alpha',\alpha'$-tetracyano-p,p'-biphenylylenedimethylene in 3.9 parts of acetonitrile. A yellow-brown color gradually developed and after warming the reaction mixture for one hour at steam bath temperatures, cooling, filtering, and drying, there was obtained 0.245 part of sodium 13,13,14,14-tetracyanodiphenoquinodimethanide as a green-brown solid melting above 405° C. The infrared spectrum showed strong, broad nitrile absorption at 2,150 cm.$^{-1}$. The sodium tetracyanodiphenoquinodimethanide exhibited a strong EPR signal.

*Analysis.*—Calcd. for $C_{18}H_8N_4Na$: C, 71.4%; H, 2.7%. Found: C, 72.4%; H, 3.5%.

*Part F.—Preparation of Copper 13,13,14,14-Tetracyanodiphenoquinodimethanide*

A clear copper wire was dipped into a warm slurry of a small amount of poly($\alpha,\alpha,\alpha',\alpha'$-tetracyano-p,p'-biphenylylenedimethylene) and 2 ml. of a 1/1 acetonitrile/dimethylformamide mixture. After standing for 1.5 hours at room temperature, the wire was observed to be coated with red copper bis(13,13,14,14-tetracyanodiphenoquinodimethanide). The poly(p,p'-biphenylylenebis(dicyanomethylene)) is thus useful as a dyeing agent for metals.

As evidenced by the foregoing species, the anion-radical charge-transfer compounds or salts of the present invention are generically colored solids with good thermal stability. This combination of properties makes them particularly useful as coloring agents and/or pigments, especially the latter, for a wide range of organic or inorganic compositions and particularly for such polymeric film and fiber forming compositions where coloring and/or pigmenting requirements and techniques are well known.

The sodium TCNDQide of Part E of the foregoing example exhibited a volume resistivity of $3.3 \times 10^3$ ohm-cm. as determined on a powder compact by the two-probe technique. In view of this level of resistivity, the TCNDQide anion-radical salts are useful as semiconductors and in compact, or preferably single-crystal, form as circuit elements in such devices as thermistors, thermocouples, modulators, voltage regulators, amplifiers, radiation detectors, and the like.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A salt charge-transfer compound of the formula $$\text{Cation}\left[\begin{array}{c}\text{CN}\\|\\\text{C}\\|\\\text{CN}\end{array}=\underset{}{\bigcirc}=\underset{}{\bigcirc}=\begin{array}{c}\text{CN}\\|\\\text{C}\\|\\\text{CN}\end{array}\right]^{-\cdot}$$

where the cation is that of a Lewis base.

2. Sodium 13,13,14,14-tetracyanodiphenoquinodimethanide.

3. Copper bis(13,13,14,14-tetracyanodiphenoquinodimethanide.

4. Poly($\alpha,\alpha,\alpha',\alpha'$-tetracyano-p,p'-biphenylylenedimethylene).

5. A process for the preparation of a salt charge-transfer compound of the formula $$\text{Cation}\left[\begin{array}{c}\text{CN}\\|\\\text{C}\\|\\\text{CN}\end{array}=\underset{}{\bigcirc}=\underset{}{\bigcirc}=\begin{array}{c}\text{CN}\\|\\\text{C}\\|\\\text{CN}\end{array}\right]^{-\cdot}$$

where the cation is that of a Lewis base, which comprises carboalkoxylating a compound of the formula

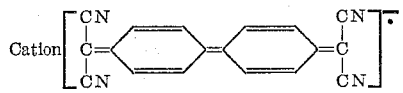

thereby forming the bis(cyanoacetic) ester of said compound; reacting said bis(cyanoacetic) ester with an ammonia source, thereby forming the cyanoacetamide of said compound; dehydrating said cyanoacetamide, thereby forming the tetranitrile of said compound; dehydrogenating said tetranitrile, thereby forming a homopolymer of the following structural unit:

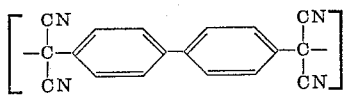

and contacting said homopolymer with a source of a Lewis base, thereby forming a salt charge-transfer compound of the aforesaid formula.

6. A process for the preparation of sodium 13,13,14,14-tetracyanodiphenoquinodimethanide, which comprises carboalkoxylating p,p'-bis(cyanomethyl)biphenyl with diethyl carbonate, thereby forming p,p'-biphenylylenebis(ethyl cyanoacetate); reacting said p,p'-biphenylylenebis(ethyl cyanoacetate) with ammonium hydroxide, thereby forming p,p'-biphenylylenebis(cyanoacetamide); dehydrating said p,p'-biphenylylenebis(cyanoacetamide) with phosphorus oxychloride, thereby forming p,p'-biphenylylenedimalononitrile; dehydrogenating said p,p'-biphenylylenedimalononitrile with N-iodosuccinimide, thereby forming poly($\alpha,\alpha,\alpha',\alpha'$-tetracyano-p,p'-biphenylylenedimethylene); and contacting said poly($\alpha,\alpha,\alpha',\alpha'$-tetracyano-p,p'-biphenylylenedimethylene) with sodium iodide, thereby forming the aforesaid sodium 13,13,14,14-tetracyanodiphenoquinodimethanide.

7. A process for the preparation of a homopolymer of the following structural unit:

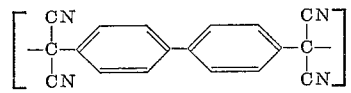

which comprises carboalkoxylating a compound of the formula

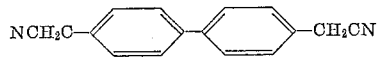

thereby forming the bis(cyanoacetic) ester of said compound; reacting said bis(cyanoacetic) ester with an ammonia source, thereby forming the cyanoacetamide of said compound; dehydrating said cyanoacetamide, thereby forming the tetranitrile of said compound; and dehydrogenating said tetranitrile, thereby forming a homopolymer of the aforesaid structural unit.

8. A process for the preparation of poly($\alpha,\alpha,\alpha',\alpha'$-tetracyano-p,p'-biphenylylenedimethylene), which comprises carboalkoxylating p,p'-bis(cyanomethyl)biphenyl with diethyl carbonate, thereby forming p,p'-biphenylylenebis(ethyl cyanoacetate); reacting said p,p'-biphenylylenebis(ethyl cyanoacetate) with ammonium hydroxide, thereby forming p,p'-biphenylyleneb(cyanoactamide); dehydrating said p,p'-biphenylylenebis(cyanoacetamide) with phosphorus oxychloride, thereby forming p,p'-biphenylylenedimalononitrile; and dehydrogenating said p,p'-biphenylylenedimalononitrile with N-iodosuccinimide, thereby forming the aforesaid poly($\alpha,\alpha,\alpha',\alpha'$-tetracyano-p,p'-biphenylylenedimethylene).

9. A process for the preparation of a salt charge-transfer compound of the formula

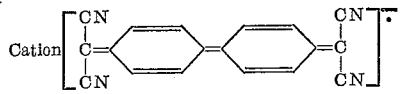

where the cation is that of a Lewis base, which comprise contacting a homopolymer of the following structural unit:

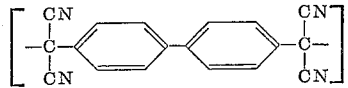

with a source of a Lewis base, thereby forming a salt charge-transfer compound of the aforesaid formula.

10. A process for the preparation of sodium 13,13,14,14-tetracyanodiphenoquinodimethanide, which comprises contacting poly($\alpha,\alpha,\alpha',\alpha'$-tetracyano-p,p'-biphenylylenedimethyene) with sodium iodide.

11. A process for the preparation of copper bis(13,13,14,14-tetracyanodiphenoquinodimethanide), which comprises contacting poly($\alpha,\alpha,\alpha',\alpha'$-tetracyano-p,p'-biphenylylenedimethylene) with metallic copper.

No references cited.

UNITED STATES PATENT OFFICE
CERTIFICATE OF CORRECTION

Patent No. 3,153,658                  October 20, 1964

Walter R. Hertler

It is hereby certified that error appears in the above numbered patent requiring correction and that the said Letters Patent should read as corrected below.

Column 8, line 55, before the period insert a closing parenthesis; column 10, line 10, for "p,p'-biphenylyleneb(cyanoactamide)" read -- p,p'-biphenylylenebis(cyanoacetamide) --.

Signed and sealed this 9th day of March 1965.

(SEAL)
Attest:

ERNEST W. SWIDER                  EDWARD J. BRENNER
Attesting Officer                    Commissioner of Patents